United States Patent [19]

Wouda et al.

[11] 4,228,409

[45] Oct. 14, 1980

[54] TRANSMISSION ARRANGEMENT HAVING AN ADJUSTABLE NETWORK

[75] Inventors: Kornelis J. Wouda; Alberto M. Giacometti; Willem Riede, all of Hilversum, Netherlands

[73] Assignee: U.S. Philips Corporation, New York, N.Y.

[21] Appl. No.: 971,770

[22] Filed: Dec. 21, 1978

Related U.S. Application Data

[63] Continuation of Ser. No. 825,305, Aug. 17, 1977, abandoned.

[30] Foreign Application Priority Data

Aug. 30, 1976 [NL] Netherlands .......................... 7609605

[51] Int. Cl.$^2$ ............................................. H03H 7/14
[52] U.S. Cl. ................................. 333/28 R; 330/254; 330/304; 333/18
[58] Field of Search .............. 333/28 R; 330/254, 304

[56] References Cited

U.S. PATENT DOCUMENTS

| | | | |
|---|---|---|---|
| 3,210,683 | 10/1965 | Pay .................................... | 330/254 X |
| 3,452,292 | 6/1969 | Kennedy ............................... | 330/254 |
| 3,509,481 | 4/1970 | Halsey .................................. | 330/304 |
| 3,663,898 | 5/1972 | Kao et al. ........................ | 333/28 R X |
| 3,743,959 | 7/1973 | Kobayashi ........................... | 330/304 |
| 4,045,748 | 8/1977 | Filliman ........................... | 330/254 X |

Primary Examiner—Paul L. Gensler
Attorney, Agent, or Firm—Thomas A. Briody; William J. Streeter; Simon L. Cohen

[57] ABSTRACT

A transmission arrangement provided with at least one adjustable network whose transfer characteristic between input and output as a function of the frequency $\omega$ within a prescribed frequency band is approximately equal to $C \exp[kf(\omega)]$, where C is a constant and k a continuously variable parameter.

A simple design as well as a large practically feasible adjustment range are obtained because the adjustable network comprises a plurality of channels between input and output and the transfer characteristic of a channel is approximately proportional to a term, different for each channel, from the series of terms of the development of $\exp[kf(\omega)]$ to powers of $kf(\omega)$, the number of terms corresponding with the number of channels.

9 Claims, 8 Drawing Figures

TRANSMISSION ARRANGEMENT HAVING AN ADJUSTABLE NETWORK

This is a continuation of application Ser. No. 825,305, filed Aug. 17, 1977, now abandoned.

The invention relates to a transmission arrangement provided with at least one adjustable network, whose transfer characteristic between input and output as a function of the frequency $\omega$ within a prescribed frequency band is approximately equal to $C \exp[kf(\omega)]$, where $C$ is a constant and $k$ a continuously variable parameter. Transmission arrangements of this type are frequently used as equalizing amplifier in repeaters of systems for transmission of analog or digital signals via coaxial cables.

In such transmission systems the transfer characteristic of the cable section between two successive repeaters is also a function of the length of the section and the cable temperature. To obtain an implementation of the equalizing amplifier which is as uniform as possible this amplifier comprises both a fixed network equalizing the transfer characteristic of the preceding cable section at a nominal section length and at a nominal cable temperature, and also an adjustable network for equalizing variations relative to this nominal transfer characteristic caused by the cable temperature varying with time and the deviations from nominal section length which are unavoidable in practice.

In many applications this adjustable equalizing network is constructed as a Bode equalizer, in which the network determining the transfer characteristic of this equalizer is realized as a four-pole network of constant resistance and in which the transfer characteristic can be changed by adjusting a single resistance element connected to this four-pole network (cf. H. W. Bode, "Variable Equalizers", Bell System Technical Journal, Vol. 17, No. 2, Apr. 1938, pages 229–244). Bode has shown that for this type of equalizer the desired change in the transfer characteristic (a change at one frequency should always be accompanied by proportional changes at all other frequencies in the given frequency band) cannot be realized exactly but that the deviations can be kept within acceptable limits provided the range of adjustment is not too large.

As regards the adjustment range also other factors play a limiting role in the practical implementation of this Bode equalizer. An important factor is constituted by the working range of the technically available adjustable resistance elements, for which a resistance variation of 1:10, especially at frequencies of 100 MHz and higher, is already difficult to be realized. The unavoidable circuit parasitics constitute another important factor especially those of the adjustable resistance element. These last parasitics exercise their greatest influence just at the extreme resistance values of the adjustable resistance element. These parasitics are not only co-determining for the upper limit of the equalizer's frequency band, but they also result in that the equalizer no longer obeys its original design equations. As a result, the equalizer will show greater amplitude and phase deviations. Furthermore, in the transmission of digital signals the fact that the Bode equalizer is a minimum phase network also plays a role, so that even amplitude deviations caused by the parasitics at frequencies where the signal energy has almost disappeared, and thus acceptable in themselves, effect impermissible phase deviations at frequencies where the signal energy is still high. The above-mentioned factors result in that the practically feasible adjustment range of the Bode equalizer is considerably limited.

It is an object of the invention to provide a transmission arrangement of the type mentioned in the preamble, in which owing to a new concept of the adjustable network the possibilities of application are considerably extended, especially as regards the practically feasible adjustment range.

The transmission arrangement according to the invention is characterized in that the adjustable network comprises a plurality of channels between input and output, the transfer characteristic of a channel being approximately proportional with a term different for each channel, from the series of terms of the developement of $\exp[kf(\omega)]$ to powers of $kf(\omega)$, the number of terms corresponding with the number of channels.

The invention and its advantages will now be further explained with reference to the drawing, wherein.

Figure 1:
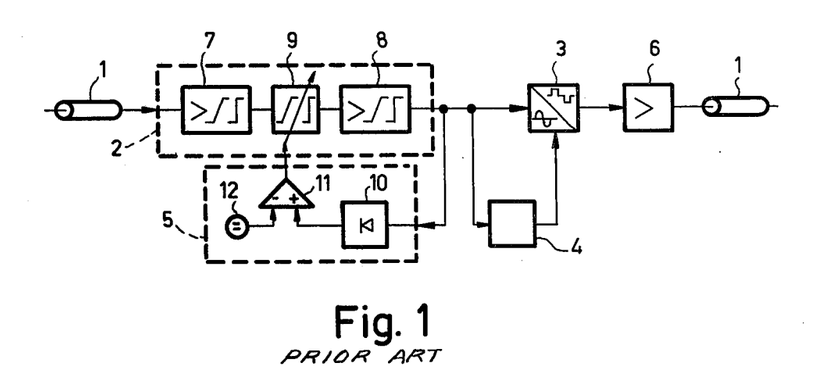
FIG. 1 shows the prior art structure of repeater in a system for digital signal transmission via a coaxial cable.

The repeater shown in FIG. 1 is part of a system for digital signal transmission via a coaxial cable 1, for example 140 mBit/s signals through a coaxial cable having a center conductor of 1.2 mm diameter and an outer conductor 4.4 mm diameter by means of a three-level line code of the 4 B/3 T type, whereby blocks of four binary symbols are converted into blocks of three ternary symbols.

This repeater comprises an equalizing amplifier 2 for equalizing the amplitude and phase characteristics of the preceding cable section. A regenerator 3 is connected to the output of equalizing amplifier 2 for regenerating the received digital signals as to form and instant of occurrence, as well as a clock extraction circuit 4 for recovering a clock signal for controlling regenerator 3. In addition, an adjusting circuit 5 is connected to the output of equalizing amplifier 2 which circuit generates an adjusting signal for automatically matching equalizing amplifier 2 if the transfer characteristic of the preceding cable section shows variations relative to its nominal form as a result of deviating section lengths and variations in the cable temperature. The regenerated digital signals are applied to the subsequent cable section through an output amplifier 6 which, in many cases includes a fixed equalizer.

The equalizing amplifier 2 comprises two fixed sections 7, 8 in which the actual amplification of the digital signals received and the equalization of the preceding cable section at a nominal section length and at a nominal cable temperature is effected. For the benefit of the regeneration these fixed sections 7, 8 are mostly adjusted such that the overall transfer function of the nominal cable section and these fixed sections 7, 8 approximately satisfies the first Nyquist criterion (no intersymbol interference on the nominal regeneration instants). An adjustable section 9 is inserted between the two fixed sections 7, 8 for equalizing variations relative to the nominal transfer characteristic caused by the cable temperature varying with time and the deviations from nominal section length which are unavoidable in practice. In spite of the divergent section lengths one and the same implementation of equalizing amplifier 2 for all repeaters will be sufficient in the majority of cases.

The adjusting circuit 5 comprises a peak detector 10 for generating a signal proportional to the peak value of the digital signals at the output of equalizing amplifier 2, as well as a difference amplifier 11 to which peak detector 10 and a reference source 12 are connected for obtaining the adjusting signal for adjustable section 9. By means of this control loop it is achieved that the digital signals at the output of equalizing amplifier 2 have a constant peak value determined by reference source 12. Thus an automatic equalization of variations relative to the nominal transfer characteristic of the preceding cable section is obtained, as it can be shown that the peak value of the equalized digital signals is a very suitable criterion for the losses in this cable section.

Figure 2:
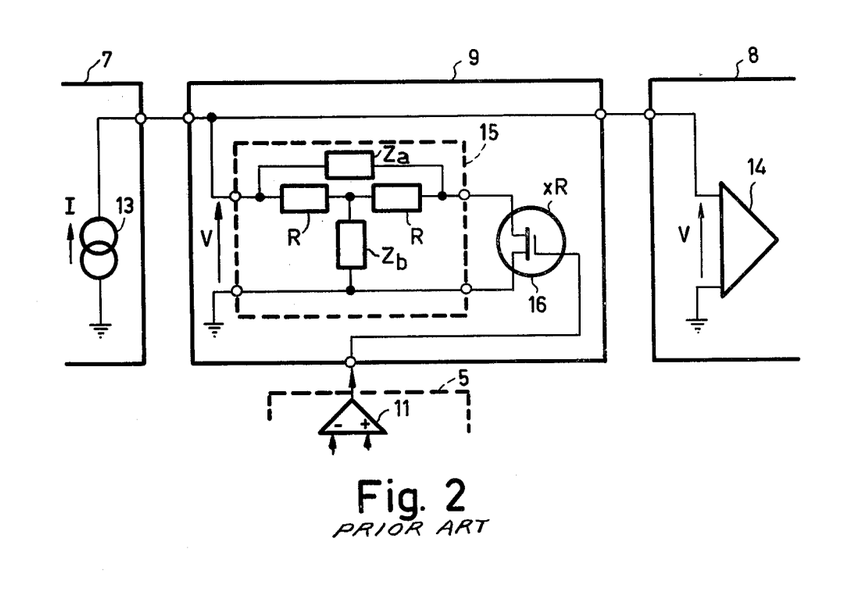
FIG. 2 shows a block diagram of the adjustable equalizer section of the repeater in FIG. 1 which is constructed in known manner as Bode equalizer.

FIG. 2 shows in greater detail how adjustable section 9 of equalizing amplifier 2 in FIG. 1 can be constructed in known manner as Bode-equalizer. In this example, equalizing amplifier 2 of FIG. 1 is arranged so that in practice fixed section 7 acts as a current source 13 from which the digital signals are derived in the form of a current I, adjustable section 9 acts as an impedance Z, to which this current I is applied, and fixed section 8 has a first stage 14 having an imput impedance which is much larger than Z. Then the digital signals are applied to this fixed section 8 in the form of voltage V=IZ which is produced across adjustable section 9 as a result of the current I of fixed section 7.

The transfer characteristic of adjustable section 9 in FIG. 2 is determined by a four-pole network 15 of constant resistant and this transfer characteristic can be changed by adjusting a single resistance element 16 connected to this four-pole network 15. In its most general form four-pole network 15 is composed of a cascade of bridged T-networks and all-pass filters, but in the majority of applications it is sufficient to use a single bridged T-network as shown in FIG. 2. The series arm of this four-pole network 15 comprises two identical resistors R shunted by an impedance $Z_a$ and the shunt arm comprises an impedance $Z_b$ which satisfies the condition $Z_a Z_b = R^2$. The characteristic or image impedance of this four-pole network 15 is then equal to R. In addition, resistance element 16 in FIG. 2 is formed by a field effect transistor whose resistance value can be adjusted by applying adjusting signal derived from setting circuit 5 in FIG. 2 to its gate electrode.

As adjustable section 9 in FIG. 1 is meant for compensating for deviations relative to the nominal cable transfer characteristic, the transfer characteristic of adjustable section 9 should have the same effect as adding or removing a piece of cable of a suitable length. This implies in FIG. 2 that the impedance Z of adjustable section 9 (the input impedance of four-pole network 15) as a function of the frequency ω should satisfy the relation:

$$Z(\omega) = C \exp\left[ k \sqrt{\omega} (1 + j) \right] \quad (1)$$

where C is a constant and k a continuously variable parameter meter which is proportional to the departures from the nominal temperature and section length of the cable.

The following relation can be derived for the impedance Z of adjustable section 9 in FIG. 2 if resistance element 16 is adjusted to a resistance value xR:

$$Z = R(1 + rT^2)/(1 - rT^2) \quad (2)$$

Here T is the propagation factor of four-pole network 15 which in FIG. 2 is equal to $R/(R+Z_a)$ so that its absolute value is always smaller than 1 and furthermore:

$$r = (x-1)/(x+1) \quad (3)$$

so that r lies between the values $-1$ and $+1$ because x cantheoretically take all values between 0 and ∞.

The impedance Z in accordance with formula (2) can be reasonably approached by the relation:

$$Z = R \exp[2rT^2] \quad (4)$$

provided r does not take excessive values. Furthermore four-pole network 15 can be designed such that its propagation factor T as a function of the frequency ω within the frequency band to be equalized approximately satisfies the relation:

$$T^2(\omega) = C' \sqrt{\omega} (1 + j) \quad (5)$$

where C' is a proportionality constant. By means of the equations:

$$R = C$$
$$2rC' = k \quad (6)$$

it then follows from formulas (4) and (5) that the impedance Z of adjustable section 9 in FIG. 2 forms in its turn a reasonable approximation of the desired transfer characteristic according to formula (1) provided that the requirements are satisified which the validity of formulas (4) and (5) impose on the magnitude of the adjustment range and on the frequency proportionality.

In the above design considerations it was tacitly assumed that adjustable element 16 in FIG. 2 is a pure resistance for all values x. The technically available adjustable resistance elements, however, all have a limited working range and moreover show unavoidable parasitic reactances. These parasitics exercise their greatest influence just at the limits of the working range and can more in particular be represented by a series inductance at the minimum resistance value $x_{min}R$ and by a parallel capacitance at the maximum resistance value $x_{max}R$.

The consequences of these parasitics are twofold: firstly they impose an upper limit on the frequency band to be equalized and secondly they cause the transfer characteristic of adjustable section 9 in FIG. 2 to deviate from its original design formulas (2)–(5) as the parameter r prevailing therein can no longer be considered as a real number. Consequently the actual amplitude and phase deviations are greater than anticipated in the theoretical design. In addition, these deviations are interrelated because adjustable section 9 is a minimum phase network with the result that amplitude deviations which are acceptable in themselves may cause impermissible phase deviations. This effect is strengthened by the fact that when designing four-pole network 15 in FIG. 2 the impedances $Z_a$ and $Z_b$ used are frequently of a type showing resonance near the upper limit of the frequency band to be equalized in order to keep the unfavourable influence of adjustable section 9 on the noise factor of the complete equalizing amplifier 2 in FIG. 1 as low as possible when adjusting resistance element 16 in FIG. 2 to its maximum resistance value $x_{max}R$.

For the example explained with reference to FIG. 1 and FIG. 2 it has been found in practice that a variation of adjustable element 16 between the resistance values R/3 and 3R is already difficult to realize itself, but that it is more difficult to realize an adjustment range of 12 dB for the attenuation of adjustable section 9 at the Nyquist frequency (in this example half the band frequency of the ternary symbols, so 52.5 MHz), which adjustment range can theoretically be obtained for this resistance variation on account of the design formulas (2)–(5), and at the same time to keep the amplitude and phase deviations in the entire frequency band to be equalized within acceptable limits.

Figure 3:
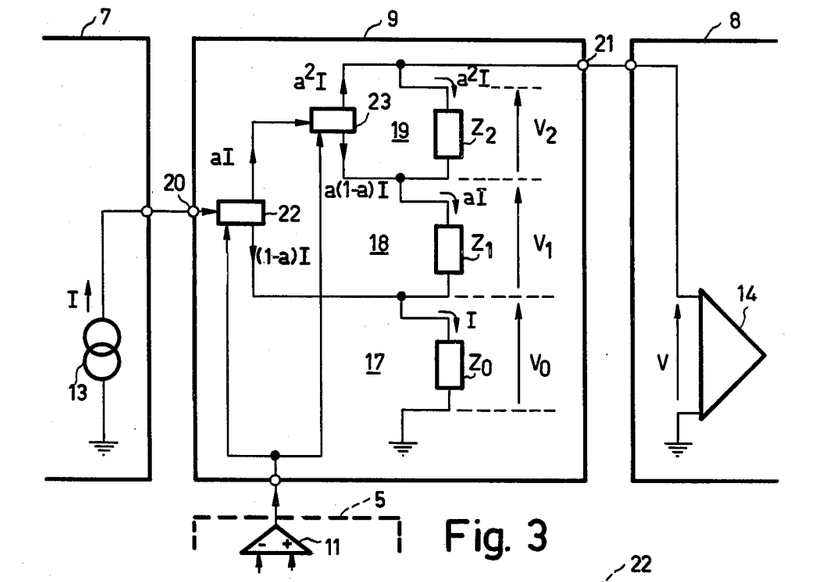
FIG. 3 shows a block diagram of the adjustable equalizing section of the repeater in FIG. 1 which is constructed in accordance with the invention.

FIG. 3 shows how adjustable section 9 of equalizing amplifier 2 in FIG. 1 may be constructed in accordance with the invention when this equalizing amplifier 2 is arranged in the same manner as in the example of FIG. 2.

The adjustable section 9 in FIG. 3 comprises three channels 17, 18, 19 between input 20 and output 21. As in FIG. 2 the digital signals are derived from fixed section 7 in the form of a current I. This current I is split in a control element 22 into a current aI and a current (1−a)I, where the continuously variable parameter a lies between the values 0 and 1 and can be adjusted by means of the adjusting signal originating from adjusting circuit 5 in FIG. 3. In its turn the current aI is split in a control element 23 into a current $a^2I$ and a current $a(1-a)I$. The current $a^2I$ originating from control element 23 is supplied in channel 19 to an impedance $Z_2$ and is thereafter combined with the current $a(1-a)I$ also originating from control element 23. The current aI resulting from this combination is applied in channel 18 to an impedance $Z_1$ and is thereafter combined with the current (1−a)I originating from control element 22. The current I resulting from this combination is finally applied in channel 17 to an impedance $Z_o$. In response to the currents I, aI, $a^2I$, the voltages $V_o$, $V_1$, $V_2$ are produced across the impedances $Z_o$, $Z_1$, $Z_2$ in the channels 17, 18, 19 respectively, which voltages are given by:

$$V_o = IZ_o \quad V_1 = aIZ_1 \quad V_2 = a^2IZ_2 \tag{7}$$

The digital signals are then applied to fixed section 8 in the form of a voltage V which is produced across adjustable section 9 owing to the current I of fixed section 7, which voltage is given by:

$$V = V_o + V_1 + V_2 = I(Z_1 + aZ_1 + a^2Z_2) \tag{8}$$

Thus, also in FIG. 3 adjustable section 9 acts as an impedance $Z = V/I$ which on account of formula (8) satisfies the relation:

$$Z = Z_0[1 + a(Z_1/Z_0) + a^2(Z_2/Z_0)] \tag{9}$$

On the other hand the desired transfer characteristic of adjustable section 9 in FIG. 3 should again satisfy the relation given in formula (1) which can be rewritten as:

$$Z(\omega) = C \exp\left[ aA(1+j)\sqrt{\omega/\omega_N} \right] \tag{10}$$

by means of the equation:

$$k = aA/\sqrt{\omega_N} \tag{11}$$

where A is the magnitude of the desired adjustment range for the attenuation at the Nyquist frequency $\omega_N$.

In accordance with the invention, the impedance Z of adjustable section 9 according to formula (9) now forms a reasonable approximation of the desired transfer characteristic according to formula (10), because the transfer characteristic of the channels 17, 18, and 19 is approximately equal to the first, second, and third term, respectively, of the series expansion of this transfer characteristic to powers of the argument of the exponential function in formula (10). By truncating this series expansion after the third term the desired transfer characteristic $Z(\omega)$ according to formula (10) is approximated by the relation:

$$Z(\omega) = C\left[ 1 + aA(1+j)\sqrt{\omega/\omega_N} + a^2A^2j\omega/\omega_N \right] \tag{12}$$

The transfer characteristic of the channels 17, 18, 19 is given by $V_0/I$, $V_1/I$, $V_2/I$ and consequently on account of formulas (7) and (8) by the first, second, and third term, respectively, of formula (9) for the impedance Z. If now the impedancies $Z_0$, $Z_1$, $Z_2$ in channels 17, 18, and 19 are chosen such that:

$$Z_0 = C \tag{13}$$
$$Z_1/Z_0 = A(1+j)\sqrt{\omega/\omega_N} \tag{14}$$
$$Z_2/Z_0 = A^2j\,\omega/\omega_N \tag{15}$$

then the impedance Z of adjustable section 9 in FIG. 3 according to formula (9) is equal to the transfer characteristic according to formula (12) and so also a reasonable approximation of the desired transfer characteristic according to formula (10).

If furthermore the constant C in formulas (10) and (12) just like in the example of FIG. 2, are made equal to a resistance R, then the formulas (13)–(15) can be written as:

$$Z_0 = R \tag{16}$$
$$Z_1 = (A(1+j))\sqrt{\omega/\omega_N}\,R = \sqrt{j\omega(2A^2R^2/\omega_N)} \tag{17}$$
$$Z_2 = A^2j(\omega/\omega_N)R = j\omega(A^2R/\omega_N) \tag{18}$$

Figure 4:
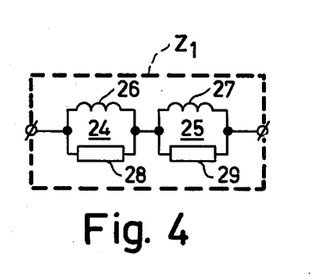
FIG. 4, FIG. 5, and FIG. 6 show a possible implementation of some elements of the adjustable equalizing section in FIG. 3.

From these formulas it appears that the impedances $Z_0$ and $Z_2$ can be simply constructed as a resistance R and a coil having a self-induction $A^2R/\omega_N$. In addition, it appears that the impedance $Z_1$ corresponds with the characteristic impedance of a cable having a resistance and a capacitance per meter equal to zero and having a quotient of inductance and conductance per meter equal to $2A^2R^2/\omega_N$. Such a passive impedance $Z_1$ can be approximated as closely as required by a plurality of RL-networks by means of known optimization techniques. For the example considered it has been found in practice that an implementation of impedance $Z_1$ as shown in FIG. 4 already results in an approximation of the impedance $Z_1$ according to formula (17) which is sufficiently accurate for the entire frequency band to be equalized. In FIG. 4 this impedance $Z_1$ is formed by the series arrangement of two RL-networks 24, 25, each comprising a parallel arrangement of a coil 26, 27 and a resistor 28, 29.

Figure 5:
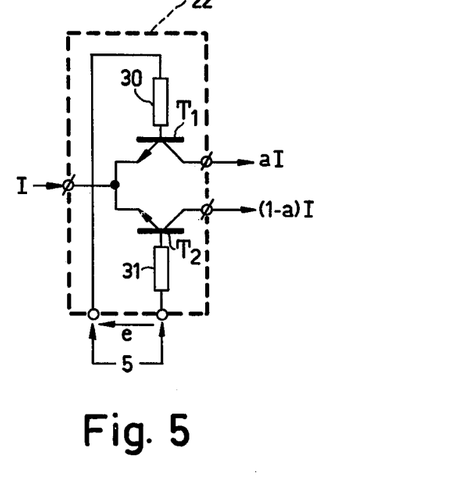

Also the control elements 22 and 23 for splitting a current into two currents with a ratio a:(1−a) can be implemented in known manner. FIG. 5 shows a simple example of a possible implementation of control element 22 in FIG. 3. This control element 22 in FIG. 5 comprises two transistors $T_1$, $T_2$ whose emitters are interconnected and whose bases are connected through two equal resistors 30, 31 to the output of adjusting circuit 5 in FIG. 1. Owing to an adjusting voltage e originating from this circuit 5 the current I applied to the interconnected emitters of transistors $T_1$, $T_2$ is split into a current aI flowing through transistor $T_1$ and a current (1−a)I flowing through transistor $T_2$. With the transistors now available the practical adjustment range for the continuously variable parameter a does not noticeably differ from the theoretical adjustment range having the limits a=0 and a=1. The relation between adjustment voltage e and parameter a is non-linear. If desired this relation can be linearized by means of an auxiliary circuit but in the present application this non-linear relation is of no importance as adjustable section 9 is part of a control loop (cf. FIG. 1) and setting voltage e directly depends on the signals which are transmitted through adjustable section 9. For the example considered the influence of parasitics on the control element in FIG. 5 can be fully neglected in practice, since with the presently available transistors having a current gain-bandwidth product of some GHz the influence of parasitic reactances of transistors $T_1$, $T_2$ in FIG. 5 is only noticeable for frequencies lying far above the frequency band to be equalized.

The influence of the remaining parasitics on adjustable section 9 in FIG. 3 can be taken into account in a simple manner. These parasitics are mainly constituted by parasitic capacitances across the impedances $Z_o$, $Z_1$, $Z_2$. The result of such a parasitic impedance $Z_p$ across the series arrangement of the impedances $Z_o$, $Z_1$ and $Z_2$ is a voltage V' at output 21 which is given by:

$$V' = VZ_p/(Z_o+Z_1+Z_2+Z_p) \tag{19}$$

where the voltage V at output 21 without this parasitic impedance $Z_p$ is given by formula (8). The result of a parasitic impedance $Z_q$ across the series arrangement of the impedances $Z_1$ and $Z_2$ is also a voltage V″ at output 21 which is given by:

$$V'' = V_o + (V_1+V_2)Z_q/(Z_1+Z_2+Z_q) \tag{20}$$

where the voltages $V_o$, $V_1$, $V_2$ across the impedances $Z_o$, $Z_1$, $Z_2$ in the absence of this parasitic impedance $Z_q$ are given by formulas (7).

From formulas (19) and (20) it appears that the influence of such parasitic impedances does not depend on the value of the continuously variable parameter a. The influence of impedance $Z_p$ can be simply taken into account in the design of fixed section 7, 8, whereas the influence of impedance $Z_q$ can be taken into account at a combined optimization of an approximation for impedances $Z_1$, $Z_2$.

Compared with the prior art equalizer section of FIG. 2 the adjustable equalizer section of FIG. 3 thus obtained offers two important advantages: firstly a well-ordered structure with more degrees of freedom, whereby the design can be simplified and a greater theoretical adjustment range can yet be obtained, and secondly a much lower sensitivity to parasitics so that the differences between the actual transfer characteristic and its design formulas and the differences between the practically feasible and the theoretical adjustment range are considerably reduced, and furthermore the upper limit of the frequency band to be equalized can be shifted to higher frequencies.

As already stated for the example explained with reference to FIG. 1 and FIG. 2 particularly great difficulties are encountered in realizing an adjustment range of 12 dB for the attenuation at the Nyquist frequency and yet keeping the amplitude and phase deviations in the entire frequency band to be equalized within acceptable limits when the known adjustable equalizer section of FIG. 2 is used. If however, in this example the adjustable equalizer section of FIG. 3 is used, then it appears in practice that such an adjustment range of 12 dB can easily be realized and that the deviations are much smaller than when using the prior art equalizer section of FIG. 2, but it then also appears that for acceptable deviations of the same magnitude as in the case of FIG. 3 an adjustment range of 30 dB for the attenuation at the Nyquist frequency can be realized.

In the explanation of FIG. 3 given so far the impedance $Z_o$ in channel 17 has been made equal to a resistance R. This is, however, not imperative and in some cases it may be more advantageous when impedance $Z_o$ in channel 17 is a complex impedance.

A first advantage appears from a consideration of the attenuation of adjustable section 9 in FIG. 2 and FIG. 3 as a function of the frequency $\omega$. If resistance element 16 in FIG. 2 is adjusted to the value R the attenuation of adjustable section 9 is independent of the frequency $\omega$; for, in that case x=1 and so in accordance with formula (3) adjustment parameter r=0, so that the impedance Z in accordance with formulas (2) and (4) is equal to R. If furthermore follows from formula (2) that adjustable section 9 in FIG. 2 has a double-sided character whilst, the adjustment range of the attenuation being even symmetrical relative to the constant attenuation for r=0, for replacing r by −r in formula (2) just gives the reciprocal impedance Z. If impedance $Z_o$ in channel 17 of FIG. 3 is equal to a resistance R and the adjustment parameter a is made equal to zero, the attenuation of adjustable section 9 is indeed independent of the frequency $\omega$, but it follows from formula (9) that for $Z_o=R$ adjustable section 9 in FIG. 3 has a single-sided character, the entire adjustment range of the attenuation lying at one side of the constant attenuation for a=0.

Figure 6:
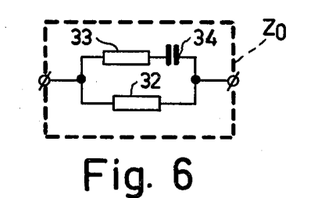

If, however, impedance $Z_o$ in channel 17 of FIG. 3 is a complex impedance with such a dependency on the frequency $\omega$, that particularly at the Nyquist frequency, the attenuation for $a=0$ deviates for half the attenuation adjustment range from the constant frequency-independent attenuation, then the adjustment range of the attenuation lies on either side of this constant attenuation and, consequently, adjustable section 9 in FIG. 3 has also a double-sided character. For the example considered this can be achieved in a satisfactory approximation by implementing impedance $Z_o$ in accordance with FIG. 6 as a resistor 32 shunted by the series arrangement of a resistor 33 and a capacitor 34 and by choosing the time constants in a suitable manner. Of course, the impedances $Z_1$ and $Z_2$ should then be constructed in accordance with formulas (14) and (15) and not in accordance with formulas (17) and (18).

A second advantage appears from a consideration of the impedance Z of adjustable section 9 in FIG. 2 and FIG. 3 in accordance with the formulas (2) and (9). For a realization with passive components requires that the real part of this impedance Z is not smaller than zero. From formula (2) then follows the restriction that the absolute value of $rT^2$ must be smaller than 1 but from formula (9) no such limitation follows. If now impedance $Z_o$ in channel 17 is a complex impedance, said requirement on the real part thus holds for the impedances themselves, but not for the individual impedance ratios $Z_1/Z_o$ and $Z_2/Z_o$ in formula (9) which results in additional degrees of freedom when designing adjustable section 9 according to FIG. 3.

The method described for approximating the desired transfer characteristic according to formula (1) and (10) can be applied without modifications to a desired transfer characteristic of a more general form which is given by:

$$Z(\omega) = C \,[\exp kf(\omega)] \tag{21}$$

If the number of terms in the series expansion to powers of the argument of the exponential function in formula (21), and hence also the number of channels of adjustable section 9 in FIG. 3, is equal to N+1 then the desired transfer characteristic according to formula (21) is approximated by the relation:

$$Z(\omega) = C \sum_{n=0}^{N} [kf(\omega)]^n/n! \tag{22}$$

and the impedance Z of adjustable 9 in FIG. 3 analogous with formula (9) is given by the relation:

$$Z = Z_0 \sum_{n=0}^{N} a^n (Z_n/Z_0) \tag{23}$$

By now again choosing $Z_o = C$ (cf. formula (13)) and by choosing the impedancies $Z_n$ such that:

$$Z_n/Z_o = [kf(\omega)]n/n \cdot a^n) \tag{24}$$

the impedance Z of adjustable section 9 according to formula (23) is equal to the transfer characteristic according to formula (22) and consequently also a reasonable approximation of the desired transfer characteristic according to formula (21).

With this generalization account should be taken of the requirement for the realization of impedance $Z_n$ that its real part may not be smaller than zero so that it invariably holds:

$$-(\pi/2) \leq \arg Z_n \leq (\pi/2) \tag{25}$$

On the other hand, on account of formula (24), arg $Z_n$ must satisfy the relation:

$$\arg Z_n = \arg Z_o + n \arg f(\omega) \tag{26}$$

If now impedance $Z_o$ is a resistance R (cf. formula (16)) then arg $Z_o = 0$, so that on account of formulas (25) and (26) the following restriction holds for the number of terms and channels:

$$n \leq (\pi/2)|\arg f(\omega)| \tag{27}$$

In the example of FIG. 2 and FIG. 3 the explanation is given for:

$$f(\omega) = (1 + j)\sqrt{\omega} \tag{28}$$

so that $\arg f(\omega) = \pi/4$ and n can in that case be not more than 2 and, consequently, adjustable section 9 in FIG. 3 may comprise a number of channels not exceeding 3.

Also here it appears that the choice of a complex impedance $Z_o$ in channel 17 of FIG. 3 may offer advantages. For, if this impedance $Z_o$ is chosen such that in addition arg $Z_o$ and arg $f(\omega)$ have an opposite sign, then on account of formulas (25) and (26) a greater value of n is found than the value according to formula (27) so that the desired transfer characteristic can be approached better.

If for a prescribed accuracy of the approximation of the desired transfer characteristic according to formula (21) a given value N is required in formula (22), and if this value N may not be used in formula (23) on account of the requirements indicated for the practical realization of the impedance $Z_n$, an attempt can be made to replace the series in formula (22) by the product of two factors consisting of lower order series which can be realized in accordance with formula (23). If, for example, the value N may not be used in formula (23) but the value N/2 is allowed, the desired transfer characteristic in accordance with formula (21) can be approximated by the relation:

$$Z(\omega) = C \sum_{n=0}^{N/2} [kf(\omega)/2]^n/n! \sum_{n=0}^{N/2} [kf(\omega)/2]^n/n! \tag{29}$$

Each of the two identical factors in formula (29) can then be realized by means of an adjustable section in accordance with FIG. 3. These adjustable sections are connected in cascade, the voltage across the first section acting as control signal for the current source which supplies the current to the second section. For the design of each of the two sections use is made of formulas (23) and (24) in which, however, N is now replaced by N/2, k is replaced by k/2 and $Z_o = \sqrt{C}$ is chosen.

With the approximation according to formula (29) the total deviation for both sections in cascade is at the utmost equal to the sum of the deviations for the individual sections. In view of the manner in which the deviation depends on the variable parameter, the prescribed accuracy of the approximation according to formula (22) can also be accomplished with the approximation according to formula (29) in which the value of the variable parameter is half that in formula (22). If, furthermore, the optimization of the approximation for the impedances in the individual sections is combined such that a deviation for one section is always accompanied by a deviation in the opposite sense for the other section, the total deviation for both sections in cascade can be still further reduced.

In the preceding description the method for approximating a desired transfer characteristic is always explained with reference to an adjustable network to which a current is applied and from which a voltage is derived so that the transfer characteristic of this network has the dimension of an impedance. The same approximation method, however, can be used equally well in networks whose transfer characteristic has the dimension of an admittance or the dimension 1. An example of the use of the present method in the latter case will be explained with reference to FIG. 7.

Figure 7:
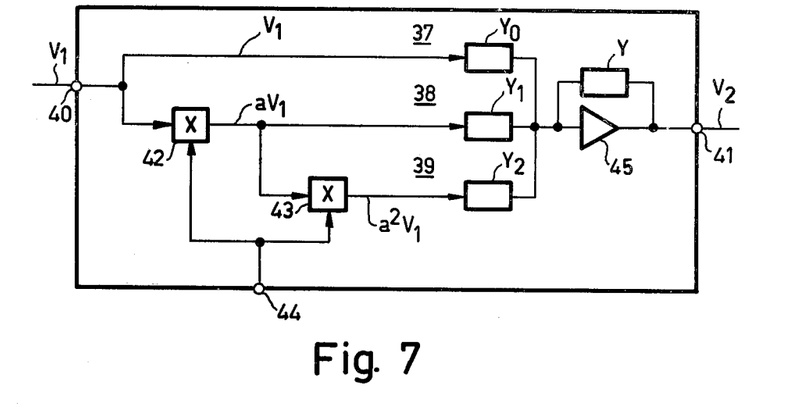
FIG. 7 is a block diagram or a second embodiment of an adjustable network in accordance with the invention.

Just as in FIG. 3 the adjustable network in FIG. 7 comprises three channels 37, 38, 39 between input 40 and output 41. However, in FIG. 7 the signals are applied to input 40 in the form of a voltage $V_1$. This voltage $V_1$ is multiplied in a control element 42 by a continuously variable parameter $a$ so that a voltage $aV_1$ is produced at the output of control element 42. In its turn the voltage $aV_1$ is multiplied in a control element 43 by the same parameter $a$ so that a voltage $a^2V_1$ is produced at the output of control element 43. These control elements 42, 43 can be implemented in known manner as two-quadrant multipliers and the continuously variable parameter $a$ can be adjusted by means of an adjusting signal at input 44. In contrast with the example of FIG. 3, where the control elements 22, 23 split a current into two currents having a ratio $a:(1=a)$, the parameter $a$ in FIG. 7 can also take values greater than 1.

The voltage $V_1$, $aV_1$, $a^2V_1$ are applied in channels 37, 38, 39 to admittances $Y_o$, $Y_1$, $Y_2$ respectively, which are jointly connected to an operational amplifier 45 having an admittance Y between output and input. Responsive to the voltage $V_1$ at input 40 a voltage $V_2$ is produced at output 41 which is given by:

$$V_2 = -(1/Y) [(Y_o + aY_1 + a^2Y_2] V_1 \quad (30)$$

Then the network of FIG. 5 has a transfer characteristic $H = V_2/V_1$ with the dimension 1, H satisfying, on account of formula (30), the relation:

$$H = -(Y_o/Y) [1 + a(Y_1/Y_o) + a^2(Y_2/Y_o)] \quad (31)$$

In the case of N+1 channels, formula (31) can be generalized to the relation:

$$H = -(Y_0/Y) \sum_{n=0}^{N} a^n (Y_n/Y_0) \quad (32)$$

Analogous to formula (21) the desired transfer characteristic has the form:

$$H(\omega) = C[\exp kf(\omega)] \quad (33)$$

and its approximation by N+1 terms is given analogous to formula (22) by:

$$H(\omega) = \left[ C \sum_{n=0}^{N} kf(\omega) \right]^n / n! \quad (34)$$

By choosing the admittance ratio $Y_o/Y$ to be equal to C and by choosing the admittance $Y_n$ such that:

$$(Y_n/Y_o) = [kf(\omega)]n/(N!a^n) \quad (35)$$

the transfer characteristic of the adjustable network in FIG. 7 according to formula (32) is, not considering the sign, equal to the transfer characteristic according to formula (34) and, consequently, a reasonable approximation of the desired transfer characteristic according to formula (33).

When formulas (32)–(35) are compared with formulas (21)–(24) then it appears that, in spite of the differences in construction between the adjustable networks of FIG. 3 and FIG. 7, the present method of approximation is applied in both cases in the same manner.

Figure 8:
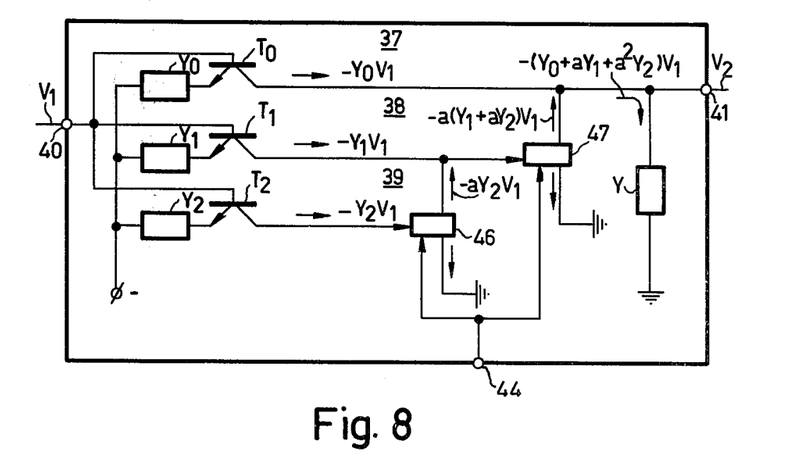
FIG. 8 is a block diagram of a third embodiment of an adjustable network in accordance with the invention.

As may also appear from the above many different implementations of the present adjustable network are possible. By way of example FIG. 8 shows an adjustable network having the same transfer characteristic as that in FIG. 7, but having much in common with the network in FIG. 3 as regards its implementation. Corresponding elements in FIG. 7 and FIG. 8 have been given the same reference numerals.

In FIG. 8 each channel 37, 38, 39 comprises a current source which is controlled by voltage $V_1$ at input 40 and which is in the form of a transistor $T_o$, $T_1$, $T_2$ having an admittance $Y_o$, $Y_1$, $Y_2$ in its emitter circuit. In response to the voltage $V_1$ the currents $-Y_oV_1$, $-Y_1V_1$, $-Y_2V_1$ are produced in channels 37, 38, 39 respectively. The current $-Y_2V_1$ in channel 39 is split in a control element 46 into a current $-(1-a)Y_2V_1$ which is not further utilized, and a current $-aY_2V_1$ which is combined with the current $-Y_1V_1$ in channel 38. In its turn the combined current $-(Y_1+aY_2)V_1$ is split in a control element 47 into a current $-(1-a)(Y_1+aY_2)$ which is not further utilized and a current $-a(Y_1+aY_2)V_1$ which is combined with the current $-Y_oV_1$ in channel 37. The current $-(Y_o+aY_1+a^2Y_2)V_1$ resulting from this last combination is applied to an admittance Y, so that at output 41 a voltage $V_2$ is produced which, as in FIG. 7, is given by formula (30). So the networks of FIG. 7 and FIG. 8 both have the transfer characteristic according to formula (31). On the other hand, the control elements 46, 47 in FIG. 8 are of the same type as those in FIG. 3 and they can be implemented in accordance with FIG. 5.

Practical considerations decide which construction of the present adjustable network should be preferred for a given application. If, for example, the constructions according to FIG. 3 and FIG. 8 are compared with one another, the current source 13 in FIG. 3 should be considered—for a proper comparison—as constituent part of adjustable section 9 and must also be implemented as a controlled current source in the form of a transistor having an admittance in its emitter circuit. Even then the construction in accordance with FIG. 3 should be preferred to that in accordance with FIG. 8, inter alia because in FIG. 8 two additional transistors are required and only one of the two currents which are derived from a control element 46, 47 is used effectively.

As stated above it can be advantageous for given applications to connect a plurality of adjustable networks in cascade. If these networks are constructed as Bode-networks (compare, for example FIG. 2), a direct connection in cascade results in an interaction between the networks owing to mismatch, so that for a proper operation isolating amplifiers are required between successive Bode-networks. An important practical advantage of the present adjustable networks (cf. for example FIG. 7 and FIG. 8) is that they can be connected directly in cascade without necessitating isolating amplifiers for a proper operation.

What is claimed is:

1. Transmission arrangement comprising at least one adjustable network having a transfer characteristic between input and output as a function of the frequency $\omega$ within a predescribed frequency band approximately equal to $C \exp [kf(\omega)]$, where C is a constant and k a continuously variable parameter, wherein the adjustable network comprises a plurality of channels between input and output, the transfer characteristic of a channel being approximately proportional to a term, different for each channel, from the series of terms of the development of $\exp \{kf(\omega)\}$ to powers of $kf(\omega)$, the number of terms corresponding with the number of channels.

2. A transmission arrangement as claimed in claim 1, wherein said adjustable network comprises a first control element having an input coupled to said adjustable network input, and first and second outputs; a second control element having an input coupled to said first element first output, and two outputs; said channels numbering three and respectively comprising a first impedance means coupled between said second element first and second outputs, a second impedance means coupled between said second element second output and said first element second output; and a third impedance means coupled to said first element second output.

3. A transmission arrangement as claimed in claim 1, wherein said third impedance means comprises a pure resistance.

4. A transmission arrangement as claimed in claim 3, wherein said third impedance means comprises a complex impedance.

5. A transmission arrangement as claimed in claim 4, wherein said complex impedance comprises a series arrangement including a first resistor and a capacitor, and a second resistor parallel coupled to said series arrangement.

6. A transmission arrangement as claimed in claim 2, wherein said control elements each comprise a pair of emitter coupled transistors.

7. A transmission arrangement as claimed in claim 1, wherein said adjustable network comprises a first control element having an input coupled to said adjustable network input and an output; a second control element having an input coupled to said first element output and an output; said channels numbering three and respectively comprising a first admittance means coupled to said network input, a second admittance means coupled to said first element output, and a third admittance means coupled to said second element output; said admittance means being coupled together.

8. A transmission arrangement as claimed in claim 1, wherein said channels number three, each channel comprising a current source coupled to said network input; an admittance means coupled to said current sources; and further comprising a first control element having a input coupled to a first of said current sources and an output; and a second control element having an input coupled to said first element output and to a second of said current sources and an output coupled to the third remaining current source.

9. A transmission arrangement as claimed in claim 8, wherein said control elements each comprise a pair of emitter coupled transistors.

* * * * *